(12) United States Patent
Lofthus et al.

(10) Patent No.: US 7,791,751 B2
(45) Date of Patent: Sep. 7, 2010

(54) PRINTING SYSTEMS

(75) Inventors: Robert M. Lofthus, Webster, NY (US);
Dusan G. Lysy, Fairport, NY (US);
Markus P. Fromherz, Palo Alto, CA
(US); Kristine A. German, Webster, NY
(US); Stephen P. Hoover, Penfield, NY
(US); Aaron Burry, West Henrietta, NY
(US); Eric S. Hamby, Fairport, NY (US)

(73) Assignee: Palo Alto Research Corporation, Palo Alto, CA (US)

( * ) Notice: Subject to any disclaimer, the term of this patent is extended or adjusted under 35 U.S.C. 154(b) by 1156 days.

(21) Appl. No.: 11/069,020

(22) Filed: Feb. 28, 2005

(65) Prior Publication Data

US 2006/0132815 A1  Jun. 22, 2006

Related U.S. Application Data

(60) Provisional application No. 60/631,656, filed on Nov. 30, 2004.

(51) Int. Cl.
*G06F 3/12* (2006.01)

(52) U.S. Cl. ............. 358/1.15; 281/15.1; 358/1.1; 358/1.9; 358/504; 399/38; 399/382; 399/49; 400/62; 715/210; 715/700; 347/5

(58) Field of Classification Search ............. 358/1.15
See application file for complete search history.

(56) References Cited

U.S. PATENT DOCUMENTS 4,579,446 A  4/1986  Fujino et al.
4,587,532 A  5/1986  Asano
4,836,119 A  6/1989  Siraco et al.
5,004,222 A  4/1991  Dobashi
5,080,340 A  1/1992  Hacknauer et al.

(Continued)

FOREIGN PATENT DOCUMENTS

JP  2003223310 A  *  8/2003

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner*—King Y Poon
*Assistant Examiner*—David S Cammack
(74) *Attorney, Agent, or Firm*—Fay Sharpe LLP

(57) ABSTRACT

A printing system includes a plurality of printers, at least a first and a second of the plurality of printers printing in a first print modality. A scheduling system schedules printing of a set of pages by the plurality of printers. The set of pages, when assembled, may include pages where a high level of consistency is desired, such as facing pages or pages which are otherwise to be placed in close relationship. The scheduling system includes at least two scheduling modes, a first mode in which a consistency constraint is applied to the set of pages, and a second mode, different from the first mode, in which the consistency constraint is not applied. The printing system is configured for printing the set of pages in accordance with the first mode and in accordance with the second mode.

25 Claims, 7 Drawing Sheets

U.S. PATENT DOCUMENTS

| | | | |
|---|---|---|---|
| 5,095,342 A | 3/1992 | Farrell et al. | |
| 5,159,395 A | 10/1992 | Farrell et al. | |
| 5,208,640 A * | 5/1993 | Horie et al. | 399/110 |
| 5,272,511 A | 12/1993 | Conrad et al. | |
| 5,326,093 A * | 7/1994 | Sollitt | 271/306 |
| 5,435,544 A | 7/1995 | Mandel | |
| 5,473,419 A | 12/1995 | Russel et al. | |
| 5,489,969 A | 2/1996 | Soler et al. | |
| 5,504,568 A | 4/1996 | Saraswat et al. | |
| 5,525,031 A | 6/1996 | Fox | |
| 5,557,367 A * | 9/1996 | Yang et al. | 399/14 |
| 5,568,246 A | 10/1996 | Keller et al. | |
| 5,570,172 A | 10/1996 | Acquaviva | |
| 5,596,416 A | 1/1997 | Barry et al. | |
| 5,629,762 A | 5/1997 | Mahoney et al. | |
| 5,710,968 A | 1/1998 | Clark et al. | |
| 5,778,377 A | 7/1998 | Marlin et al. | |
| 5,884,910 A | 3/1999 | Mandel | |
| 5,987,272 A * | 11/1999 | Maeda et al. | 399/58 |
| 5,995,721 A | 11/1999 | Rourke et al. | |
| 6,059,284 A | 5/2000 | Wolf et al. | |
| 6,097,500 A | 8/2000 | Fromherz | |
| 6,125,248 A | 9/2000 | Moser | |
| 6,241,242 B1 | 6/2001 | Munro | |
| 6,297,886 B1 | 10/2001 | Cornell | |
| 6,321,266 B1 * | 11/2001 | Yokomizo et al. | 709/226 |
| 6,341,773 B1 | 1/2002 | Aprato et al. | |
| 6,384,918 B1 | 5/2002 | Hubble, III et al. | |
| 6,450,711 B1 | 9/2002 | Conrow | |
| 6,452,692 B1 * | 9/2002 | Yacoub | 358/1.15 |
| 6,476,376 B1 | 11/2002 | Biegelsen et al. | |
| 6,476,923 B1 | 11/2002 | Cornell | |
| 6,493,098 B1 | 12/2002 | Cornell | |
| 6,537,910 B1 | 3/2003 | Burke et al. | |
| 6,550,762 B2 | 4/2003 | Stoll | |
| 6,554,276 B2 | 4/2003 | Jackson et al. | |
| 6,577,925 B1 | 6/2003 | Fromherz | |
| 6,606,165 B1 * | 8/2003 | Barry et al. | 358/1.9 |
| 6,607,320 B2 | 8/2003 | Bobrow et al. | |
| 6,608,988 B2 | 8/2003 | Conrow | |
| 6,612,566 B2 | 9/2003 | Stoll | |
| 6,612,571 B2 | 9/2003 | Rider | |
| 6,618,167 B1 | 9/2003 | Shah | |
| 6,621,576 B2 | 9/2003 | Tandon et al. | |
| 6,633,382 B2 | 10/2003 | Hubble, III et al. | |
| 6,639,669 B2 | 10/2003 | Hubble, III et al. | |
| 6,718,878 B2 | 4/2004 | Grosso et al. | |
| 6,762,771 B1 * | 7/2004 | Niki et al. | 715/700 |
| 6,814,004 B2 | 11/2004 | Lofthus et al. | |
| 6,819,906 B1 | 11/2004 | Herrmann et al. | |
| 6,925,283 B1 | 8/2005 | Mandel et al. | |
| 2002/0048041 A1* | 4/2002 | Housel et al. | 358/1.15 |
| 2002/0054314 A1* | 5/2002 | Takahashi | 358/1.13 |
| 2002/0078012 A1 | 6/2002 | Ryan et al. | |
| 2002/0097407 A1* | 7/2002 | Ryan et al. | 358/1.1 |
| 2002/0103559 A1 | 8/2002 | Gartstein | |
| 2002/0105672 A1* | 8/2002 | Housel | 358/1.15 |
| 2003/0011805 A1* | 1/2003 | Yacoub | 358/1.15 |
| 2003/0077095 A1 | 4/2003 | Conrow | |
| 2003/0164960 A1* | 9/2003 | Housel | 358/1.9 |
| 2004/0085561 A1 | 5/2004 | Fromherz | |
| 2004/0085562 A1 | 5/2004 | Fromherz | |
| 2004/0088207 A1 | 5/2004 | Fromherz | |
| 2004/0150156 A1 | 8/2004 | Fromherz et al. | |
| 2004/0150158 A1 | 8/2004 | Biegelsen et al. | |
| 2004/0153983 A1 | 8/2004 | McMillan | |
| 2004/0216002 A1 | 10/2004 | Fromherz et al. | |
| 2004/0225391 A1 | 11/2004 | Fromherz et al. | |
| 2004/0225394 A1 | 11/2004 | Fromherz et al. | |
| 2004/0247365 A1 | 12/2004 | Lofthus et al. | |
| 2005/0036159 A1* | 2/2005 | Sharma et al. | 358/1.9 |
| 2005/0042009 A1* | 2/2005 | Roztocil et al. | 400/62 |

OTHER PUBLICATIONS

Desmond Fretz, "Cluster Printing Solution Announced", Today at Xerox (TAX), No. 1129, Aug. 3, 2001.
U.S. Appl. No. 10/761,522, filed Jan. 21, 2004, Mandel et al.
U.S. Appl. No. 10/785,211, filed Feb. 24, 2004, Lofthus et al.
U.S. Appl. No. 10/881,619, filed Jun. 30, 2004, Bobrow.
U.S. Appl. No. 10/917,676, filed Aug. 13, 2004, Lofthus et al.
U.S. Appl. No. 10/917,768, filed Aug. 13, 2004, Lofthus et al.
U.S. Appl. No. 10/924,106, filed Aug. 23, 2004, Lofthus et al.
U.S. Appl. No. 10/924,113, filed Aug. 23, 2004, deJong et al.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,326, filed Nov. 30, 2004, Grace et al.
U.S. Appl. No. 10/999,450, filed Nov. 30, 2004 Lofthus et al.
U.S. Appl. No. 11/000,158, filed Nov. 30, 2004, Roof.
U.S. Appl. No. 11/051,817, filed Feb. 4, 2005, Moore et al.
U.S. Appl. No. 11/000,258, filed Nov. 30, 2004, Roof.
U.S. Appl. No. 11/001,890, filed Dec. 2, 2004, Lofthus et al.
U.S. Appl. No. 11/000,168, filed Nov. 30, 2004, Biegelsen et al.

* cited by examiner

| FINAL STATE OF FACE-DOWN STACKER FOR A 10 SHEET DUPLEX COLOR DOCUMENT PRINTED WITHOUT FACING-PAGES CONSTRAINT | FINAL STATE OF FACE-DOWN STACKER FOR A 10 SHEET DUPLEX COLOR DOCUMENT PRINTED WITH FACING-PAGES CONSTRAINT |
|---|---|
| 20 | 20 |
| 19 | 19 |
| 18 | 18 |
| 17 | 17 |
| 16 | 16 |
| 15 | 15 |
| 14 | 14 |
| 13 | 13 |
| 12 | 12 |
| 11 | 11 |
| 10 | 10 |
| 9 | 9 |
| 8 | 8 |
| 7 | 7 |
| 6 | 6 |
| 5 | 5 |
| 4 | 4 |
| 3 | 3 |
| 2 | 2 |
| 1 | 1 |

FIG. 7

PRINTING SYSTEMS

This Application claims the priority of U.S. Provisional Application No. 60/631,656, entitled TIGHTLY INTEGRATED PARALLEL PRINTING ARCHITECTURES MAKING USE OF COMBINED COLOR AND MONOCHROME ENGINES by David G. Anderson et al., filed on Nov. 30, 2004, the disclosure of which is incorporated herein in its entirety, by reference.

CROSS REFERENCE TO RELATED APPLICATIONS

This Application is related to the following applications, the disclosures of which are totally incorporated herein in their entireties, by reference:

U.S. application Ser. No. 10/917,768, filed Aug. 13, 2004, for PARALLEL PRINTING ARCHITECTURE CONSISTING OF CONTAINERIZED IMAGE MARKING ENGINES AND MEDIA FEEDER MODULES by Robert Lofthus;

U.S. application Ser. No. 10/924,106, filed Aug. 23, 2004, for PRINTING SYSTEM WITH HORIZONTAL HIGHWAY AND SINGLE PASS DUPLEX by Lofthus, et al.;

U.S. application Ser. No. 10/924,113, filed Aug. 23, 2004, for PRINTING SYSTEM WITH INVERTER DISPOSED FOR MEDIA VELOCITY BUFFERING AND REGISTRATION by dejong, et al.;

U.S. application Ser. No. 10/924,458, filed Aug. 23, 2004, for PRINT SEQUENCE SCHEDULING FOR RELIABILITY by Lofthus, et al.;

U.S. application Ser. No. 10/924,459, filed Aug. 23, 2004, for PARALLEL PRINTING ARCHITECTURE USING IMAGE MARKING ENGINE MODULES by Mandel, et al.;

U.S. application Ser. No. 10/284,560, filed Oct. 30, 2002, for PLANNING AND SCHEDULING RECONFIGURABLE SYSTEMS WITH REGULAR AND DIAGNOSTIC JOBS, by Fromherz;

U.S. application Ser. No. 10/284,561, filed Oct. 30, 2002, for PLANNING AND SCHEDULING RECONFIGURABLE SYSTEMS WITH ALTERNATIVE CAPABILITIES by Fromherz; U.S. application Ser. No. 10/424,322, filed Apr. 28, 2003, for MONITORING AND REPORTING INCREMENTAL JOB STATUS SYSTEM AND METHOD by Fromherz; and U.S. application Ser. No. 10/917,676, filed Aug. 13, 2004, entitled MULTIPLE OBJECT SOURCES CONTROLLED AND/OR SELECTED BASED ON A COMMON SENSOR by Lofthus, et al.

BACKGROUND

Disclosed is a printing system and more specifically, a scheduling system. This system finds particular application in conjunction with scheduling print jobs for improving the image consistency of adjacent images, such as those on facing pages and will be described with particular reference thereto. However, it is to be appreciated that the present exemplary embodiment is also amenable to other like applications.

The eye is particularly sensitive to differences in appearance of printed images when faced with a side by side comparison. A print job assembled in the form of a booklet has several facing pages on which images are printed. Differences in color gamut, gloss, image size, and clarity are most perceptible on the facing pages. One way to minimize the differences in image appearance between the outputs of several printers is to run test patches on the printers and compare these with a reference, using a color sensor, such as a spectrophotometer. Since the output characteristics of a printer tend to vary over time, periodic recalibration is performed to maintain color consistency. Another approach is to print all of the pages on the same printer.

Parallel printing systems have or are now being developed which employ multiple marking engines working in parallel to improve the overall system output. Jobs are assembled from the outputs of several marking engines which may print with different gloss, color gamut, and image quality characteristics. For example, in a system employing two color marking engines, the first marking engine may print front and back pages of a first sheet and a third sheet, etc., in duplex mode and the second marking engine may print front and back pages of a second sheet and a fourth sheet, etc., in duplex mode. The streams from the two marking engines are subsequently merged to form a booklet. As a result, some pages of the assembled booklet are printed by the first printer and other pages are printed by the second printer. The eye is thus presented with two side by side pages which are printed by different printers.

Imaging systems (e.g., printers and copiers) typically include paper paths through which print media sheets (e.g., sheets of plain paper) which are to receive an image are conveyed and imaged. The process of inserting sheets into the paper paths and controlling the movement of the sheets through the paper paths to receive an image on one or both sides, is referred to as "scheduling."

Electronic printing systems typically employ a print server or scanner for inputting image-bearing documents and conversion electronics for converting the image to image signals or pixels. In the case of electrophotographic printers, the signals are stored and are read out successively to a printer for formation of the images on photoconductive output media such as a photoreceptor. When multiple jobs are to be sequentially printed, a process known as "job streaming" is commonly implemented. Job streaming is the ability of a printer system to complete successive printing jobs with a minimum of delay time between jobs. A control system associated with the image output terminal of the machine identifies that multiple jobs have been scheduled, determines their characteristics and determines the necessary delay between jobs. In some cases, the control system will enable a second job to begin printing prior to completion of the first job.

REFERENCES

U.S. Pat. Nos. 6,097,500 to Fromherz and 6,618,167 to Shah, the disclosures of which are incorporated herein in their entireties, by reference, provide scheduling schemes for printers.

U.S. Pat. No. 6,814,004 to Lofthus, et al., which is incorporated herein in its entirety by reference, discloses a system in which two marking engines arranged in series are used to print a booklet in which facing pages are printed by the same duplex marking engine.

BRIEF DESCRIPTION

Aspects of the present disclosure in embodiments thereof include a printing system, a method, and a storage medium comprising information for scheduling printing of a set of images for printing by a plurality of associated printers. The printing system includes a plurality of printers, at least a first and a second of the plurality of printers printing in a first print modality. A scheduling system schedules printing of a set of images by the plurality of printers, the set of images, when assembled, including associated images. The scheduling system includes at least two scheduling modes, a first mode in which a consistency constraint is applied to the set of pages, and a second mode, different from the first mode, in which the consistency constraint is not applied. The consistency constraint provides a level of consistency between the associated images. The printing system is configured for printing the set of images in accordance with the first mode and in accordance with the second mode. Associated images may be a subset or, in some cases, all of the images, for example, those which will be on facing pages in an assembled document.

The method of printing includes associating each of a set of images with at least one print modality selected from a plurality of print modalities. A group of images in the set of images is identified, for which a consistency constraint is selected, each image being associated with at least a first print modality which is the same for each image. By computer implemented means, for example, a sequence of printing the set of images by a plurality of printers is scheduled, according to at least two modes, a first mode in which the consistency constraint is applied to the group of images, and a second mode, different from the first mode, in which the consistency constraint is not applied. The set of images is printed according to a selected one of the first mode and the second mode.

The storage medium includes information for scheduling printing of a set of pages for printing by a plurality of associated printers including information that for the set of pages (i) associates a plurality of the set of pages with a first print modality from a set of print modalities, (ii) associates a second plurality of the pages of with a second print modality different from the first print modality, (iii) identifies pairs of facing pages in which each page is of the pair associated with the same print modality. In a first mode, printing of the set of pages is scheduled such that for each pair of facing pages in which each page is associated with the first print modality, each page of the pair is printed with a printer which provides a preselected consistency. In a second mode, printing of the set of pages is scheduled differently from the first mode. One of the first and second modes is applied as a default mode and the other of the first and second modes as a user selected mode.

A "marking engine" or "printer" can encompass any device for applying an image to print media.

An "imaging device" or "printer assembly" can incorporate a plurality of marking engines, and may include other components, such as finishers, paper feeders, and the like, and encompasses copiers and multifunction machines, as well as assemblies used for printing.

A "print job" or "document" is normally a set of related sheets, usually one or more collated copy sets copied from a set of original print job sheets or electronic document page images, from a particular user, or otherwise related.

"Print medium" refers to, for example, a usually flimsy physical sheet of paper, plastic, or other suitable physical print media substrate for images, whether precut or web fed.

"Facing pages" refers to, for example, adjacent pages of a document which, when assembled into a booklet, are viewed side by side. "Opposing pages" refers to, for example, pages formed on opposite sides of the same sheet.

"Consistent printers" can be a plurality of printers which have been determined to meet certain preselected standards regarding the consistency between the images of one consistent printer and the images of another consistent printer.

A "job output destination" can be any post printing destination where the printed pages of a document are brought together, ordered in a sequence in which they can be assembled into in the finished document, such as a finisher or a temporary holding location.

BRIEF DESCRIPTION OF THE DRAWINGS

FIG. 7 shows the assembled documents of FIGS. 4 and 5 as they would appear face down in a stacker.

DETAILED DESCRIPTION

Figure 1:
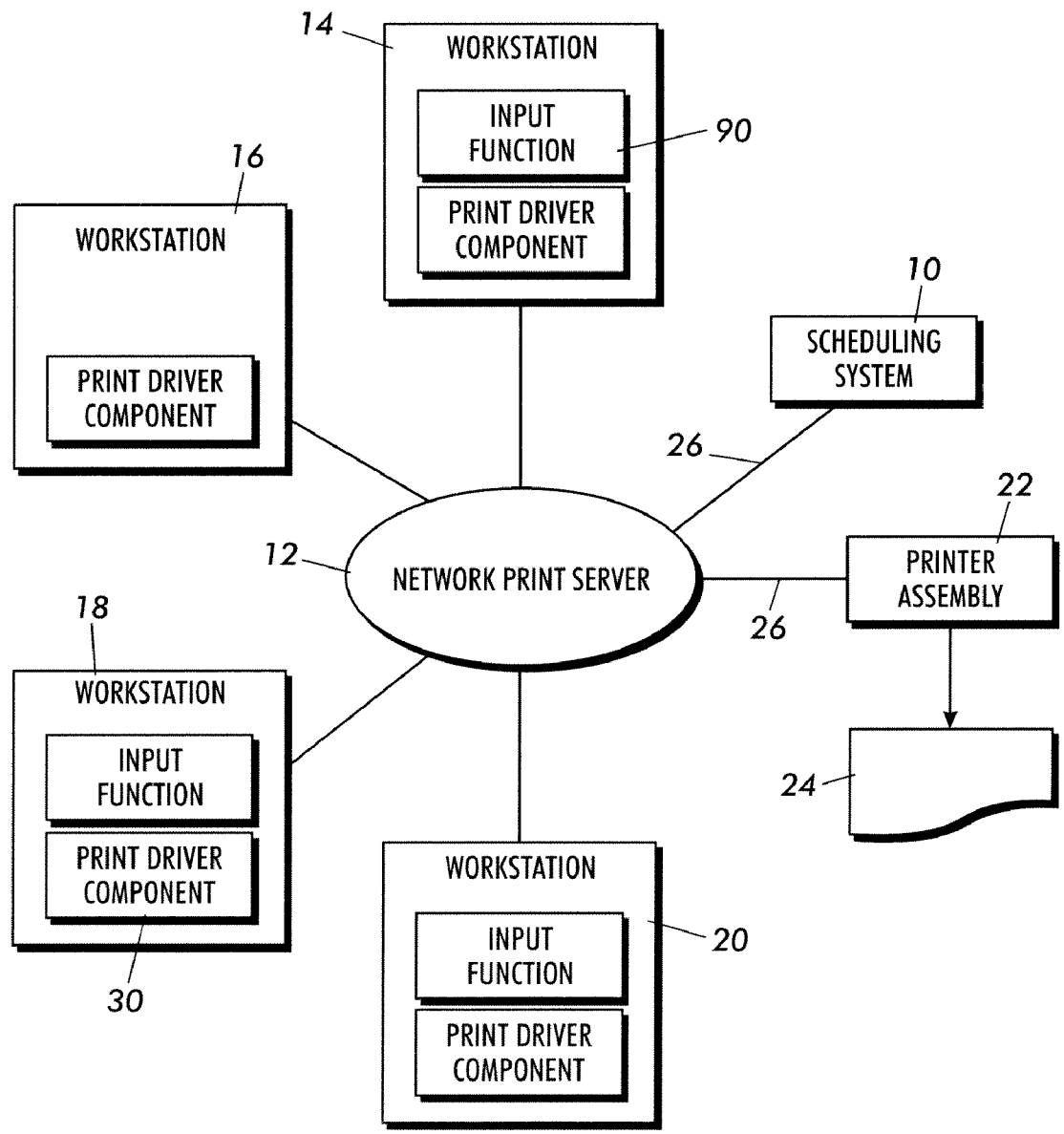
FIG. 1 is a schematic view of a printing system according to an exemplary embodiment.

A scheduling system component for a printing system enables a consistency constraint to be selectively implemented for images to be printed, such as a facing page constraint for improved image consistency in the printing of a booklet. In specific embodiments, the consistency of images on facing pages is improved by scheduling the printing of images such that a pair of facing images are printed either with the same printer or with different printers which meet preselected consistency standards. Various methods of scheduling print media sheets may be employed. For example, U.S. Pat. Nos. 5,095,342 to Farrell, et al.; 5,159,395 to Farrell, et al.; 5,557,367 to Yang, et al.; 6,097,500 to Fromherz; and 6,618,167 to Shah; and above mentioned U.S. application Ser. Nos. 10/284,560; 10/284,561; and 10/424,322 to Fromherz, all of which are incorporated herein in their entireties by reference, disclose exemplary scheduling systems which can be used to schedule the print sequence herein, with suitable modifications, such as by introducing constraints relating to facing pages. Such constraints may maximize the number of pairs of facing pages where each of the pair is printed on the same printer and/or require that particular pairs of facing pages are to be printed with the same printer/a consistent printer.

While the consistency constraint has been described with particular reference to facing pages, it will be appreciated that the constraint can be applied more generally to images which are to be assembled in association. For example, a set of pages may be printed with images which can be assembled so as to form a composite image, larger than the size of a single page in which adjacent images in the composite image are desired to be appearance (e.g., color) consistent.

In general, the scheduling system may provide an optimized schedule for processing images in an imaging device according to user-selected criteria, the image sequence constraints, and the imaging device constraints. Each constraint, if it is determined to apply to a print job, may be weighted equally and, if specified as a required constraint, must be obeyed in the optimized schedule. The image sequence constraints, user selected constraints, and imaging device constraints, can be expressed mathematically. These mathematical expressions interrelate the desired constraints of the output job to the fundamental rules of paper handling (i.e., the image sequence constraints) and the operating limitations of the imaging device or imaging devices (i.e., the imaging device constraints).

The printing system in which the present scheduling system can be incorporated may include, for example, "tandem engine" printers, "parallel" printers, or "cluster printing" (in which an electronic print job may be split up for distributed higher productivity printing by different printers, such as separate printing of the color and monochrome pages), and "output merger" or "interposer" systems: U.S. Pat. Nos. 5,568,246 to Keller, et al., 4,587,532 to Asano, 5,570,172 to Acquaviva, 5,596,416 to Barry, et al.; 5,995,721 to Rourke, et al; 4,579,446 to Fujino; 5,489,969 to Soler, et al.; 6,554,276 to Jackson, et al.; 6,607,320 to Bobrow, et al., and the above-mentioned related applications, all of which are incorporated herein by reference.

An exemplary printing system includes a plurality of printers, at least a first and a second of the plurality of printers printing in a first print modality. A scheduling system schedules printing of a set of images by the plurality of printers. The set of images, when assembled, includes associated images, the scheduling system including at least two scheduling modes: a first mode in which a consistency constraint is applied to the set of images, the consistency constraint providing a level of consistency between the associated images, and a second mode, different from said first mode, in which the consistency constraint is not applied. The printing system is configured for printing the set of images in accordance with the first mode and in accordance with the second mode.

The set of images may comprise an entire document or a portion thereof. The second mode can be a default mode and the first mode can be a user selected mode. The printing system may further include input means for selecting the first mode. The associated images include may include facing images, e.g., images formed on facing pages, and the consistency constraint may be a facing image constraint. The first mode may apply the facing image constraint such that for each pair of facing images of said first print modality, both images of the pair are printed on the same printer. In the first mode, the associated images may be printed on the same printer selected from the at least first and second of the plurality of printers which print in the first print modality. The plurality of printers of the first modality may include a plurality of consistent printers which meet preselected standards for consistency and wherein in the first mode, the scheduling system is permitted to assign at least a first of the associated images to a first of consistent printers and to assign at least a second of the associated images to a second of the consistent printers. The first modality (and other modalities) may be selected from the group consisting of black printing, process color printing, custom color printing, and magnetic ink character recognition (MICR) printing, and combinations thereof. The plurality of printers may include at least a third printer and optionally a fourth printer which print in a second print modality, different from the first modality. The first mode may apply a facing page constraint such that facing pages of the first print modality are both printed on the same printer or a consistent printer selected from the at least first and second of the plurality of printers which print in the first print modality and facing pages of the second print modality are printed on the same printer or a consistent printer selected from the third and fourth of the plurality of printers. In the first mode, the scheduling system may schedule printing of a first plurality of associated images on the first printer and schedule printing of a second plurality of associated images on the second printer. The system may include a paper pathway network which connects the first and second printers and enables print media which has a first side printed in the first printer to have a second side printed in the second printer. The paper pathway network may connect all of the printers in the system whereby print media travels between any printer and any other printer in the system. In the first mode, the scheduling system may schedule printing of two facing pages of a first sheet of print media and a second sheet of print media by a printer selected from the first and second printers and schedules printing of non facing pages of the first and second sheets on at least one printer different from the printer selected for the facing pages.

With reference to FIG. 1, an exemplary networked printing system incorporating a document scheduling system 10 is shown. The networked printing system includes a network print server 12, one or more workstations 14, 16, 18, 20 (four in the illustrated embodiment) and an imaging device or printer assembly 22 capable of printing onto a print medium 24, all interconnected by links 26. The links 26 can be a wired or wireless link or other means capable of supplying electronic data to and/or from the connected elements. Each of the workstations 14, 16, 18, 20 is associated with a print driver component 30.

FIG. 1 represents an embodiment in which the document scheduling system 10 is incorporated in, or otherwise connected to, a networked printer environment. However, the document scheduling component 10 can be located anywhere, such as in the printer assembly or distributed between several components of the system. Similarly, although the print driver component 30 is shown separately from the network print server 12 and printer assembly 22, it could be incorporated into the particular network print server 12 or printer assembly 22.

Figure 2:
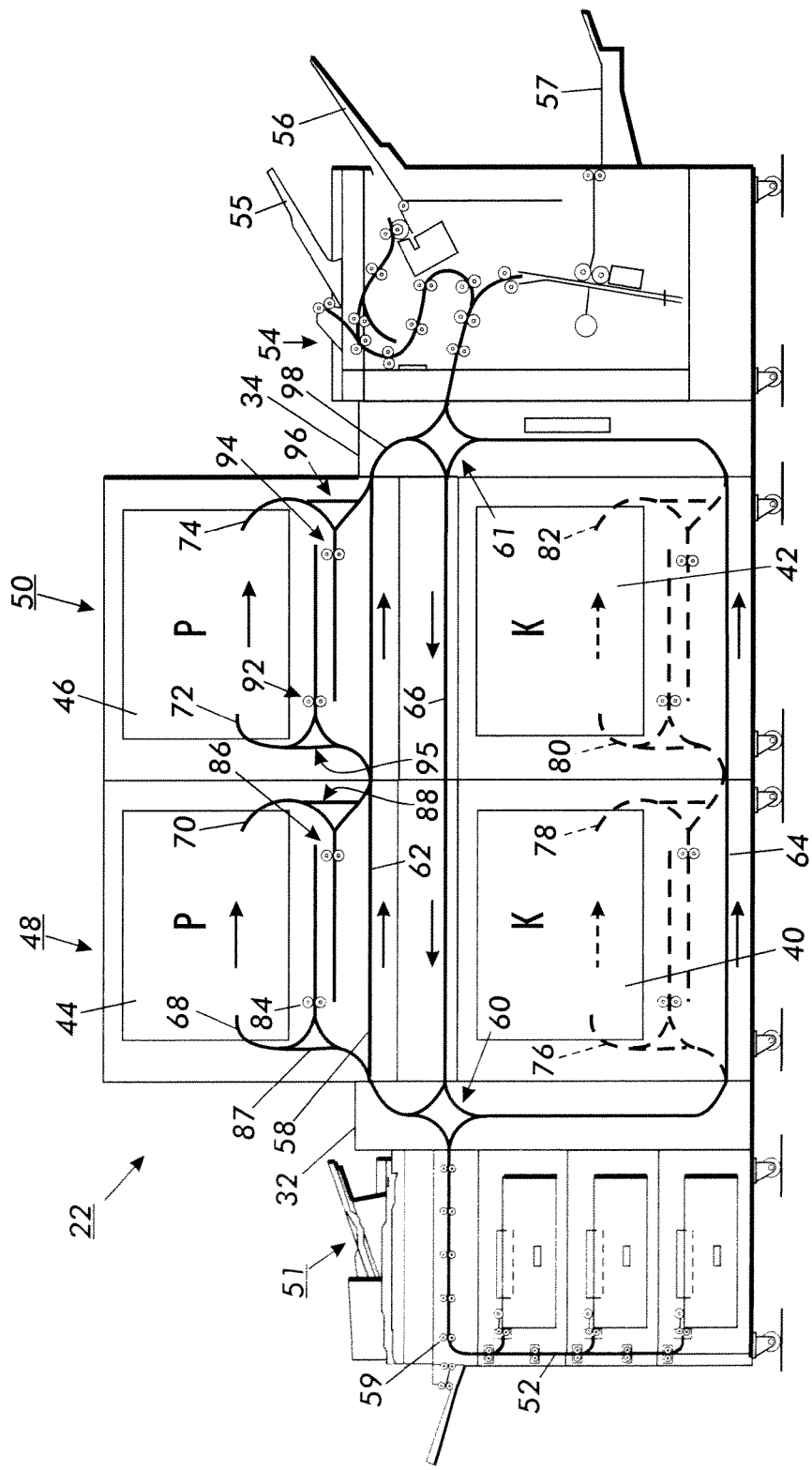
FIG. 2 is a schematic sectional view of an exemplary printer assembly for the printing system of FIG. 1.

With reference to FIG. 2, the illustrated printer assembly 22 includes several printers or marking engines, all communicating with the network print server 12. For example, a printer assembly 22 may consist of several identical or different, parallel and/or serial printers connected through flexible paper paths that feed to and collect from these printers. At any one time, a plurality of the printers can be printing. More than one of the printers can be employed in printing a single print job. More than one print job can be in the course of printing at any one time. By way of example, a single print job may use one or more printers of a first modality (such as black only) and/or one or more printers of a second modality (such as process color).

Process color printers generally employ three inks, magenta, cyan, and yellow, and generally also black (i.e., CMYK). Different colors are achieved by combinations of the three primary colors. Custom color printers may be fed with an alternatively dyed or pigmented ink or toner, or a premixed ink or toner, which provides a specific color, generally with a higher color rendering accuracy than can be achieved with a process color printer. Custom color here is used interchangeably with other terms in the trade, such as signature color, highlight color, or Pantone™ color. Magnetic Ink Character Recognition (MICR) printing applies a magnetic pattern or other detectable portion to the page, for example, as a security feature for bank notes.

While it is contemplated that marking devices may be capable of generating more than one type of print modality, for ease of reference, the marking devices described herein will be referred to as black only (K), process color (P), and custom color (C) marking devices. Additionally, it will be appreciated that some of the pages will be identified with more than one modality (mixed modality pages). For example, a page of a document may have a process color header and a body of text in black. In such a case, the page will be identified as a combined modality page, e.g., (K,P). In one operating mode, any sheet which includes at least one pixel of color is printed by a process color printer (mode 0). In another mode (mode 1) any page (back or front of a sheet) which includes at least one pixel of color is printed by a process color printer. In the illustrated example, both the header and the body text are applied by the same printer or a consistent printer, e.g., a process color printer. In another mode (mode 2), any page with images of multiple modalities is printed by printers of each modality, where available, in the printing system. In the illustrated embodiment, a process color printer prints the header and a different printer, in this case a black only printer, prints the body of text in black. Any one of the modes 0, 1, 2 may be selected as the default mode, with the other(s) being a user selectable mode.

FIG. 2 illustrates an exemplary printer assembly 22 with input and output print media distributors 32, 34 which feed to and collect from two black (K) only printers 40, 42, and two process color (P) printers 44, 46. The black printers are arranged in series, one in a first tower 48 and the other in a second tower 50, and the process color printers 44, 46, are arranged in series, above the black printers, although the printers of the same modality could alternatively be arranged in parallel, with two printers of the same type in a tower. The printers may operate at the same print speed or at different speeds. It will be appreciated that the printing system may include fewer or more printers, depending on the anticipated print volume and color requirements. While FIG. 2 illustrates a multifunction machine with a scanner 51, for forming copies, it will be appreciated that the assembly 22 may be a dedicated printing device without such copying capability.

Each printer 40, 42, 44, 46 includes components suitable for forming an image on the print media and fixing the image thereto. In the case of an electrographic device, the printer typically includes a charge retentive surface, such as a photoconductor belt or drum, a charging station for each of the colors to be applied (four in the case of a CMYK printer), an image input device which forms a latent image on the photoreceptor, and a toner developing station associated with each charging station for developing the latent image formed on the surface of the photoreceptor by applying a toner to obtain a toner image. A pretransfer charging unit charges the developed latent image. A transferring unit transfers the toner image thus formed to the surface of a print media substrate, such as a sheet of paper. A fuser fuses the image to the sheet. Although not illustrated on FIG. 2, such components are well known, as described, for example, in above-referenced copending application Ser. Nos. 10/917,768, 10/924,106, 10/924,113, and 10/924,459.

A print media feed system 52 supplies print media to the printers via the input distributor 32. In the illustrated embodiment, all of the printers are fed with print media from a single high speed and capacity feeder module 52, although it will be appreciated that one or more of the printers may be fed from separate feeders. A feeder module of this type is described for example, in above-mentioned application Ser. No. 10/917, 768. After printing, the sheets are conveyed via the output distributor 34 to a job output destination, exemplified by a finisher module 54, with three separate finishing capabilities 55, 56, 57, here represented by output trays. The finisher module receives printed media from any one of the clustered printers. The finisher may assemble the printed pages into a booklet, e.g., by one or more of stapling, binding, folding, and the like.

The feeder module 52, printers 40, 42, 44, 46, distributors 32, 34, and finisher module 54 are interconnected by a paper pathway network 58. The paper pathway network 58 includes a plurality of drive elements 59, illustrated as pairs of rollers, although other drive elements, such as airjets, spherical balls, and the like are also contemplated. The paper pathway network 58 may include at least one downstream print media highway 62, 64 (two in the illustrated embodiment), and at least one upstream print media highway 66, along which the print media is conveyed in a generally opposite direction to the downstream highways 62, 64. The highways 62, 64, 66 are arranged generally horizontally, and in parallel in the illustrated embodiment, although it is also contemplated that portions of these highways may travel in other directions, including vertically. The main highways 62, 64, 66 are connected at ends thereof with each other, and with the feeder module 52 and finisher module 54, by cloverleaf connection pathways 60, 61 in the respective distributors 32, 34.

Pathways 68, 70, 72, 74, 76, 78, 80, 82, etc. feed the print media between the highways and the printers 40, 42, 44, 46. The highways 62, 64, 66 and/or pathways 68, 70, 72, 74, 76, 78, 80, 82 may include inverters, reverters, interposers, bypass pathways, and the like as known in the art to direct the print media between the highway and a selected printer or between two printers. For example, as shown in FIG. 2, printer 44 has an input side inverter 84 and an output side inverter 86 connected with the respective input and output pathways 68, 70. The network 58 is structured such that one or both the inverters 84, 86 can be bypassed, in the illustrated embodiment, by incorporation of bypass pathways 87, 88 on the input and output sides respectively. The other printers 40, 42, 46 may be similarly configured with input and output pathways, inverters, and bypass pathways, as shown.

The architecture, described above, enables the use of multiple marking engines within the same system and can provide simplex and duplex printing as well as multi-pass printing. In single pass duplexing, one side of a sheet is printed on one marking engine, while the second side is printed on a second marking engine. In conventional duplex printing, the sheet is recirculated back to the first engine for printing the second side. In multi-pass printing, one side of a sheet is printed on one marking engine, and the same side is printed on another marking engine. A single sheet of paper may thus be marked by two or more of the printers or marked a plurality of times by the same printer, before reaching the finisher module 54. The highways 62, 64, 66, and optionally also other pathways in the system, may be high speed pathways in which the sheets are temporarily accelerated to a higher speed than can be achieved within the printers.

The scheduling system 10 determines which printers to employ to complete a print job and optionally also the route that the print media takes to the selected printers. Having a plurality of printers 40, 42, 44, 46, capable of independent contemporaneous operation and capable of feeding printed pages to each other and to a common finisher module 54 enables a wide variety of scheduling options. The default mode of the scheduling system 10 may be selected to maximize the output of the printing system, i.e., to minimize the time for a print job to be completed. Thus, in the default mode, the printing system may print one side of a page with one color printer in simplex mode and another with another color printer in simplex mode, without any constraint as to which printer is used for facing pages. In another embodiment (not illustrated), in the default mode, the scheduling system may use one printer to print some of the pages in a conventional duplex mode (i.e., one printer prints first one side and then the other side of a sheet) and a second printer to print other pages in conventional duplex mode. While in its simplest form, the default mode of the scheduling system may be set to maximize output of the printing system, the default mode may incorporate various scheduling constraints, such as reducing downtime of one or more printers, to improve reliability of the printing system, such as is described in above-mentioned copending application Ser. No. 10/924,458.

In a second mode, which may be a user selected mode, the scheduling system is input with one or more selectable constraints to improve consistency between facing pages/images or other groups of pages/images where a high level of consistency is desired, which will be referred to herein as facing pages constraints or consistency constraints. For example, the user may specify that all facing pages having images of a particular modality, such as black or color, are to be color consistent, e.g., specify that all the facing color pages are to be consistent but adopt the default mode for the facing black pages. Or the user may specify that all pairs of facing pages, of whatever modality, are to be color consistent, i.e., both pages of a facing pair of the same modality are to be printed on the same printer or by a consistent printer.

In a printer assembly as shown in FIG. 2 where plural printers of first and second modalities, such as plural color printers and plural black only printers, are available, the following user selectable facing page constraints may be available, for example:

1. Entire booklet to be printed by the same color printer/a consistent color printer.
2. Facing pages to be printed by the same color printer/a consistent color printer.
3. Facing color pages of a pair to be printed by the same color printer/a consistent color printer, e.g., one pair may be printed on one printer, another pair may be printed on another printer.
4. All pairs of facing color pages to be printed on the same printer/a consistent printer, i.e., one printer (or consistent printers) prints all the pairs of color facing pages.
5. All color pages to be printed by the same color printer/a consistent color printer, whether facing or not.
6. Facing black only pages of a pair to be printed by the same black printer/a consistent black printer, e.g., one pair may be printed on one printer, another pair may be printed on another printer.
7. All pairs of facing black only pages to be printed on the same black printer/a consistent black printer, e.g., one printer prints all the pairs of black facing pages.
8. All black pages to be printed by the same black printer/a consistent black printer, whether facing or not.
9. Combinations of constraints 2-8.

Where more than two modalities are represented in a printing assembly, further constraints may be added to meet customer preferences. A consistency input function is employed by the user to select the facing page constraint or constraints. As illustrated in FIG. 1, an input function 90 may be located in the workstations and accessed by a user interface, such as a keyboard, although other locations and interface means are contemplated, such as within the printer assembly. The facing page constraint may be a required constraint (a hard constraint), such that the print job will not be executed unless the constraint can be satisfied, or the constraint may be an optimizing constraint (soft constraint) in which the scheduling system tries to satisfy the constraint and if this is not possible, maximizes the degree to which the constraint is satisfied, to the extent permitted while ensuring that other required constraints are satisfied.

In some cases, two or more printers of the same modality may be determined to be consistent in that they meet predetermined standards for consistency between images of one printer and the images of another printer. Whether the printers meet the predetermined consistency standard may be determined by eye, for example, by examining images printed by two printers which are placed side-by-side and determining whether there are any recognizable differences. Or the printers may be determined to be consistent by sending images to a detection system, such as an in-line sensor. The sensor measures one or more properties of the image, such as color, gloss, and the like. Suitable sensors include spectrophotometers and colorimeters for color sensing and gloss meters for measuring gloss. If the images fall within selected tolerances for each of the properties selected, the images are considered to be consistent and the printers from which they issued are also considered consistent. Since the outputs of printers tend to change over time, periodic reevaluation of the two or more printers is performed to determine whether they are still consistent. At the reevaluation, a different pair of printers or group of printers may be determined to be consistent. If the printing system is unable to perform a consistency check within a specified period, the scheduling system may be programmed to use the same printer for ensuring consistency.

It will be appreciated that the performance characteristics of printers tend to drift over time and that different printers may drift at different rates. Accordingly, two printers which are determined to be consistent at one time may lose their consistency with time. Similarly, printers which are at one time inconsistent may drift, relative to one another, such that at a later time they are within acceptable variation to be considered consistent. Drift rate for either a single printer or a group of like-performance printers can be used to estimate the time to reach a given printing performance threshold. Time-to-threshold, in turn, can be accounted for in the facing pages constraint by providing a time window during which pairs of facing pages need to be printed in order to assure an acceptable level of print quality variation between the facing pages. Drift rate can be determined by logging measured printer performance over time, by calculation according to machine operating conditions, or by calculations that are updated by measurements of printer performance.

While the facing page constraint has been described as being a user selected mode, a facing page constraint could alternatively be a default mode, with a "no facing page constraint" being a user selected mode.

The scheduling system 10 receives information on the selected constraint(s) and uses the constraint(s) to develop a schedule for printing. The schedule ensures that the facing pages of any pair of facing pages of the selected modality or modalities subject to any required facing pages constraint(s) selected are printed with the same printer/a consistent printer. In the case of an optimized constraint, the scheduling system maximizes the number of facing pages to which the constraint is applicable.

For example, in a document of n pages in length to be assembled in booklet form, without page folding, the first page may be the front (F) of a first sheet (S1) identified as S1F, the second on the reverse side of the first sheet (S1R), the third page is on the front of a second sheet (S2F), and so forth, such that pages 2 and 3 are facing, pages 4 and 5 are facing, etc. If all the pages are color and a constraint for consistency of all facing color pages is selected, the scheduling system 10 may schedule pages 2 and 3 to be printed on a first color printer 44 and pages 4 and 5 to be printed on the same printer, which may be the first color printer 44 or a second color printer 46. Pages 6 and 7 may be printed on the first printer 44, and so forth to page n or n−1, if n is a page on its own. Page 1, being on its own, is unaffected by the facing page constraint, and can be printed on any color printer. Optionally, the constraint ensures that front and back pages of the booklet, where of the same modality, are printed on the same printer.

Where the booklet is formed by folding or slitting of larger pages, e.g., each sheet of print media supplies four (or more) pages of the booklet, it will be appreciated that the facing page constraint will apply to all pages printed at the same time. Thus, for example in a booklet formed of three sheets and having twelve pages, pages 2 and 11 may be on the same side of the first sheet and thus printed at the same time. Accordingly, any facing page constraint applicable to page 2 is also applied to page 11, and vice versa.

Figure 3:
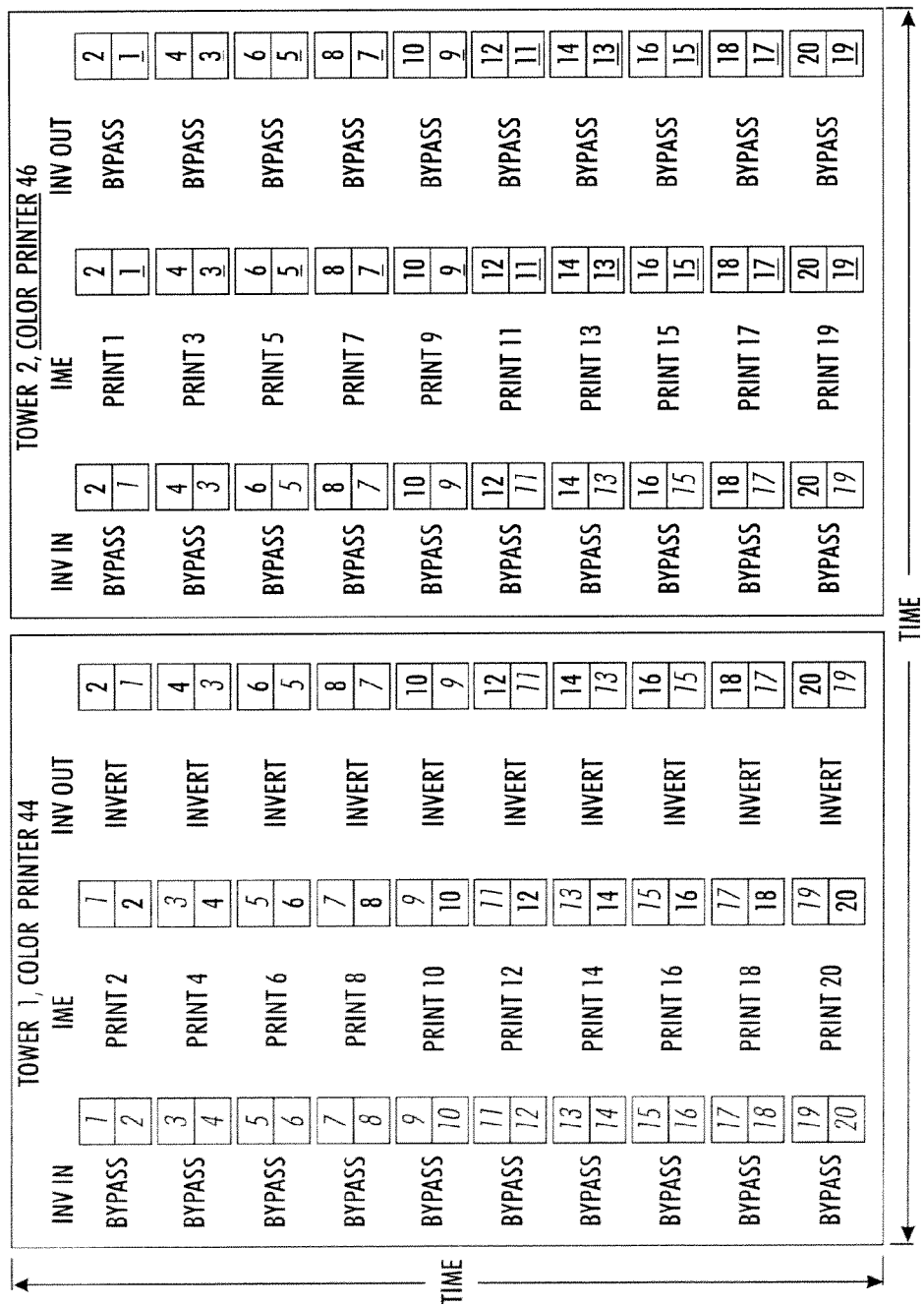
FIG. 3 shows a schedule for an exemplary print job using two printers of the same modality in a simplex mode without a facing images constraint.

In one embodiment, the printer assembly shown in FIG. 2 has a paper pathway network 58 which permits both parallel printing and series printing. For example, as illustrated in FIG. 3 for the job illustrated above with two pages per sheet, the printers of the printer system may operate in a simplex mode in the default mode, i.e., the printer system uses single pass duplexing. A first printer, printer 44, for example, prints the reverse side of all sheets S1R, S2R, etc. corresponding to pages 2, 4, 6, 8 of the finished document, and a second printer, printer 46, for example, prints sides S1F, S2F, etc., corresponding to pages 1, 3, 5, 7, etc. of the document. For example, sheet S1 travels to printer 44 along highway 62 via bypass pathway 87 and has side S1R printed by printer 44, is inverted, by inverter 86 and then passes to printer 46 where side S1F is printed. Input and output inverters 92, 94, located upstream and downstream of printer 46, respectively, are bypassed using bypass pathways 95, 96. Sheet S2, and optionally all other sheets, follow an identical path to sheet S1.

Figure 4:
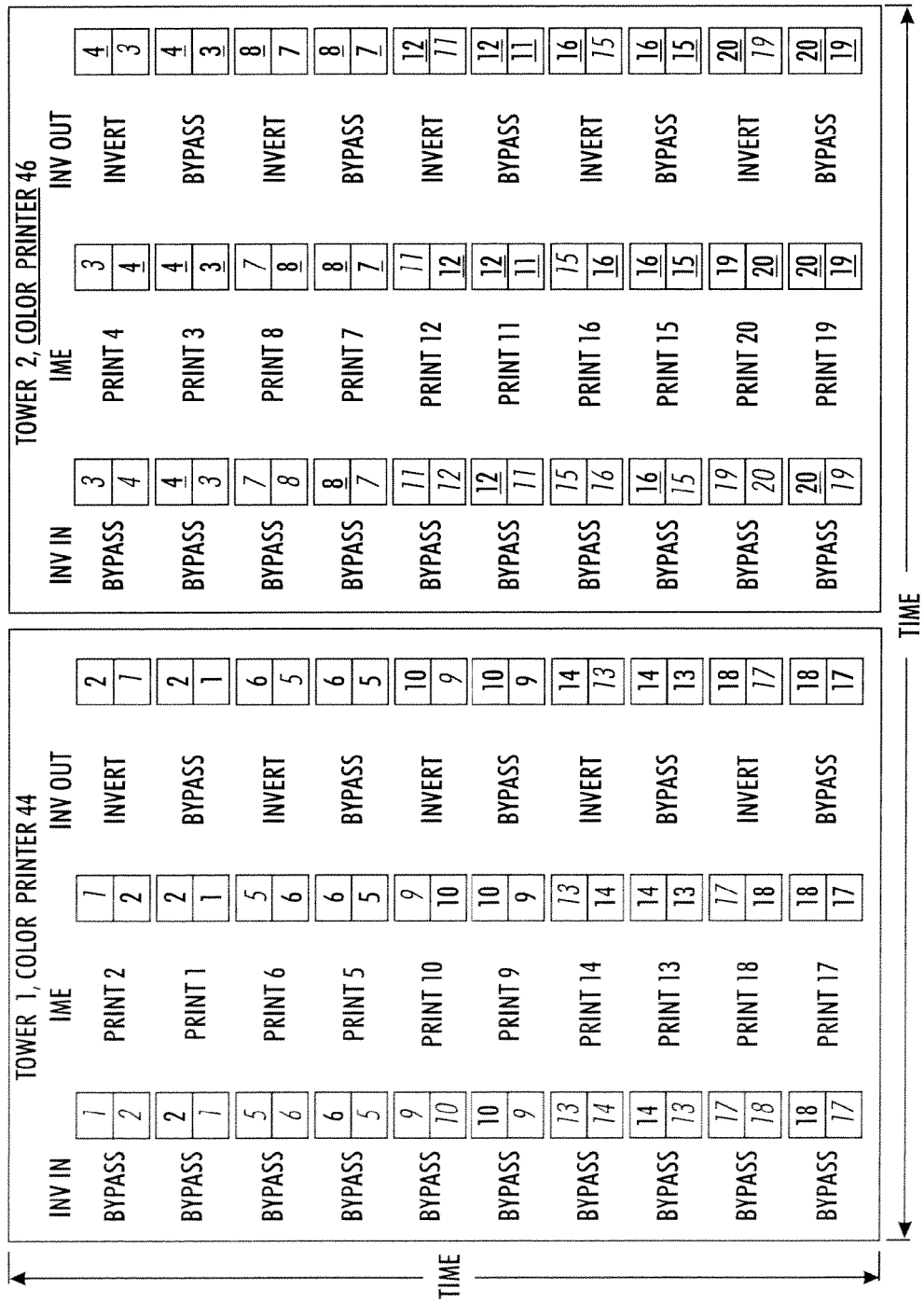
FIG. 4 shows a schedule for an exemplary print job using two printers of the same modality in a conventional duplex mode without a facing images constraint.

In another embodiment a printer assembly (not shown) can be used in which the printers 40, 42, 44, 46 have internal pathways which permit them to operate in double pass duplex mode, the printer assembly being otherwise similar to that of FIG. 2. For example, as illustrated in FIG. 4 for the job illustrated above with two pages per sheet, the printer system may operate in a conventional duplex mode in the default mode (without facing page constraint). In this embodiment, sheets S1, S3, S5, etc. may travel from the feeder 52 along highway 62 to a first printer, e.g., color printer 44 and be printed in conventional duplex mode (i.e., pass through printer 44 to have their first sides printed, be inverted in an inverter, and passed through printer 44 again) thereby printing pages S1R, S1F, S3R, S3F, etc. corresponding to pages 2, 1, 6, 5, etc. of the assembled document. Sheets S2, S4, S6, etc follow a similar procedure, passing along highway 64 to a second printer, such as color printer 46, where pages 4, 3, 8, 7, etc are printed in conventional duplex mode. The streams are combined in a pathway 98 of collector module 34, located downstream of the printers, and directed as a combined stream to the finisher 54.

Figure 5:
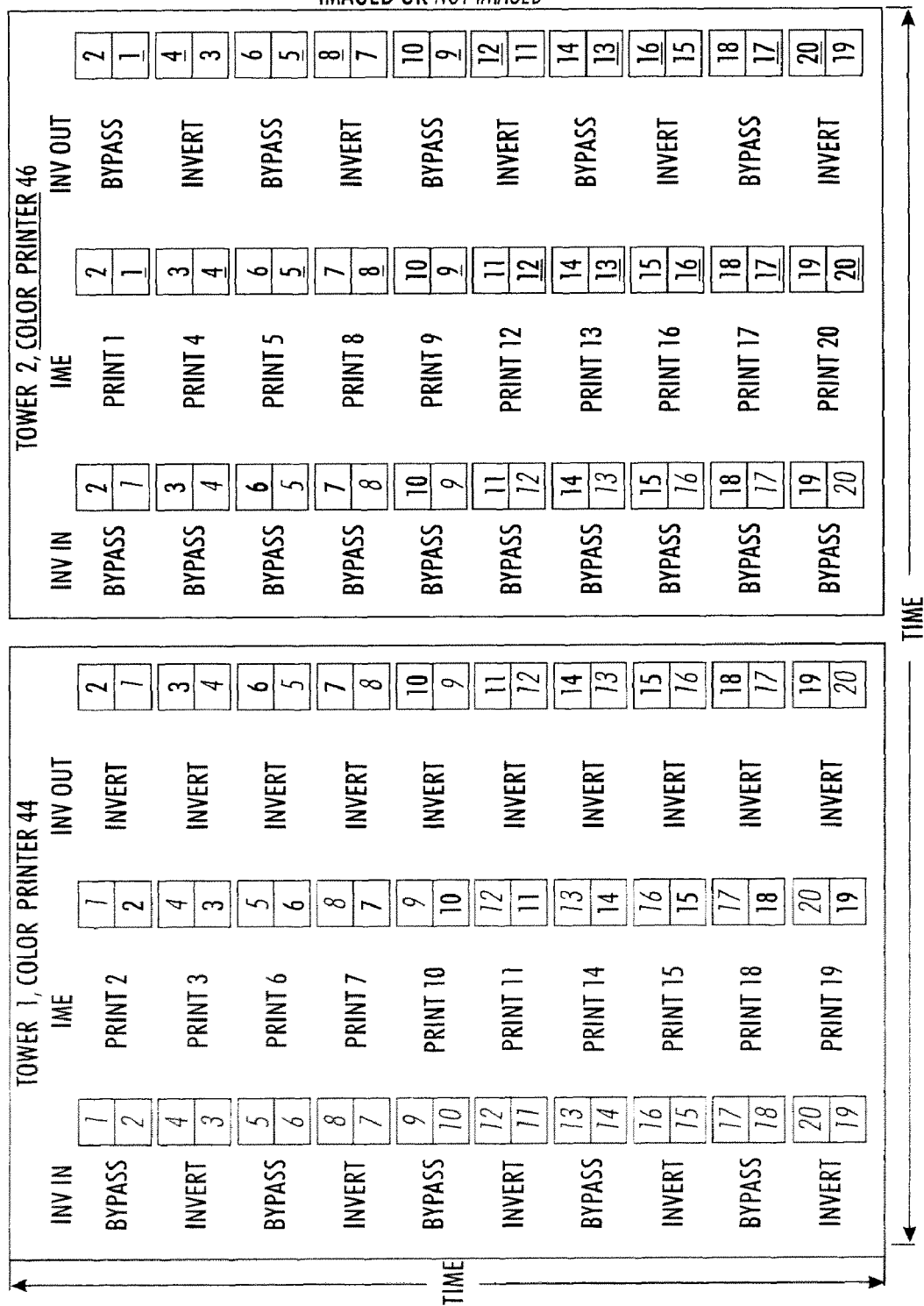
FIG. 5 shows a schedule for an exemplary print job using two printers of the same modality with a facing images constraint.

In the constraint mode, illustrated in FIG. 5, the scheduling system may ensure that for every pair of facing pages, both pages of the pair are printed with the same printer. For example, sheet S1 travels to printer 44 along highway 62 and has side S1R (page 2 of the document) printed by printer 44. Sheet S1 travels from printer 44 along to printer 46. Prior to printing S1F (page 1 of the document) in printer 46, the sheet S1 is inverted, for example, in inverter 86. Inverters 92, 94 are bypassed. Sheet S2 is also printed by printers 44 and 46, but in this case, side S2F (page 3 of the document) is printed by printer 44 and S2R (page 4 of the document) is printed by printer 46. This can be achieved by following the same route as for sheet S1 but with an inversion following the printing of S2F using inverter 86 (and optionally also inverter 84, where there are detectable differences between the top and bottom surfaces of the sheets). A further inversion with inverter 94 follows the printing of S2R. Sheets S3, S5, etc. follow the same procedure as for sheet S1 and sheets S4, S6, etc. follow the procedure for S2. The printed sheets travel in a single stream from printer 46 along highway 62 to pathway 98 and thence as a combined stream to the finisher 54. FIG. 7 schematically shows how the assembled documents produced according to the schedules of FIGS. 4 and 5 would appear at the finisher to demonstrate the differences between not applying and applying a facing page constraint. The two sides of each sheet are shown in the same block, with the facing pages spaced by a gap. It can be seen that when the facing pages constraint is applied, more of the facing pages (in this example, all the facing pages) are printed by the same printer, although not necessarily the same printer for each pair of facing pages. As for FIGS. 4 and 5, pages printed by printer 46 are identified by an underline, those by printer 44 with no underline.

The above example illustrates a facing page constraint for a single modality, process color. For more complex documents, such as documents having black and color pages and/or multiple modality pages a more complex schedule is developed, which may include more printers, and may include all of the printers available in the printer assembly. Where there is only one printer in the assembly of a particular modality, the single printer prints all pages of that modality, irrespective of whether the facing page constraint is selected.

It will be appreciated that the scheduling system 10 may not be able to fully satisfy the facing page constraint due to other imposed constraints if the other constraints have a higher priority. While the facing page constraint may be applied to all the pages in a print job it is also contemplated that the scheduling system may apply the constraint to a set of selected pages which may be fewer than all the pages in a print job. In one embodiment, the pages of the set are sequential, i.e., the scheduling system applies the constraint to a set of pages to be sequentially arranged in a document.

The scheduling system 10 may schedule more than one print job to be in progress at any one time. In doing so, the scheduling system may take into account the different speeds of the printers, the finishing requirements, and the like in scheduling the various print jobs. The scheduling system 10 may also determine a route for each sheet of each of the print jobs through the printer assembly so that the sheets arrive at the appropriate finishing station in the correct order for assembling the finished document.

Systems consisting of multiple parallel, alternative modules, such as printers, that are connected through flexible paths and even loops of the type illustrated in FIG. 2 offer a multitude of alternative operations to produce the same outputs.

An exemplary scheduling process may proceed as follows: The print driver component 30 pre-scans a print job, such as a document file and determines:

a) the number of pages of each print modality to be printed in the print job, e.g., the number of black only (K) pages, custom color (C) pages, process color (P) pages, and/or magnetic ink character recognition MICR pages;

b) the order of the pages in the print job.

This function may alternatively be carried out by another component of the system, such as the network print server.

In general, the print driver component 30 includes information about the modalities available in the printer assembly 22 and evaluates the number of pages of each print modality which are known to be available for printing in the printer assembly.

The print driver component 30 places the information regarding the pages into a file header and sends it to the network print server 12, along with the document file. The network print server 12 stores and spools the document file, including the file header. The print driver component 30 may alternatively convert a document file into a postscript print ready file. This postscript print ready file includes a header which the information on the pages in the document. The postscript print ready file is then sent to the network print server 12. Whereas in a conventional system, the file typically binds the page to a particular printer, such as P1, P2, P3 etc., depending on the print modality, here, the binding is a feature of the scheduler.

For example, the file header may include the following information about a particular print job:

Input
Number of pages: e.g., 11
Number of copies: e.g., 100
And for each page, the print modality and printer, e.g.

| | |
|---|---|
| Page 1 (S1F) | P |
| Page 2 (S1R) | K |
| Page 3 (S2F) | K |
| Page 4 (S2R) | P |
| Page 5 (S3F) | K |
| Page 6 (S3R) | P |
| Page 7 (S4F) | P |
| Page 8 (S4R) | P + K |
| Page 9 (S5F) | P |
| Page 10 (S5R) | K |
| Page 11 (S6F) | K |

Note page 8 is mixed modality, with process color and black areas of the image.

In another embodiment, the network print server 12, rather than the print driver, identifies color and black only pages in a document. For example, the network print server includes software which identifies whether a page is a black only page by examining data within the color separations for the page. Such a system is described, for example, in U.S. Pat. No. 6,718,878 to Grosso, et al., which is incorporated herein by reference.

The table below shows two exemplary print schedules for the eleven page document, one without a facing page constraint, the other where a constraint which requires all facing pages of the same modality to be printed on the same printer is applied.

printer environment in accordance with the systems and methods described herein. The process begins in step 100, and continues to step 110, where the system, during a Page Description Language (PDL) conversion scan, determines the number of pages of each print modality for the document and the order of these pages within the print job. Next in step 120, the system places the number of pages of each print modality in a file header. Then, in step 130, the system sends the PDL converted document with the file header to the print server and appropriate information regarding the image modalities for each page is sent to a planner (black and process color in the illustrated embodiment). The planner may be a separate function from the scheduling system, or integrated therein. The planner confirms that the printing system has the capabilities for printing and finishing the document and applies any appropriate policies (such as black pages to be printed on a process color printer if no black only printer is available). At step 140, user preferences regarding facing pages are optionally input to the scheduling system. If no preferences are input, the scheduling system adopts a default mode, which may be to apply no facing page constraint. At step 150, user preferences for mixed document printing are optionally input to the scheduling system 10 (e.g., mode 0, mode 1, or mode 2, discussed above). If no user preferences are input, the scheduling system adopts a default mode, such as mode 2. In the illustrated eleven page example, this would result in page 8 being printed by both a black printer and a process color printer. The mode 2 constraint that all pairs of facing pages of the same modality be printed on the same printer would thus apply to page 8 and facing page 9, with respect to the process color printing.

At step 160, an assembly tree is created in the form of a sheet level description, which associates page characteristics with each page to be printed. The assembly tree includes information such as the sheet order in the document, the requirements for each sheet, such as the text and digital images to be applied, and macro operations, such as stapling, hole punching, and the like. At step 170, the constraints, such as facing page constraints, are applied to the assembly tree. Based on this information, the scheduling system develops an itinerary for each sheet of the document (step 180). The itinerary includes such information as the route of the sheet through the printing system, and the timing of each event, such as printing, inversion, etc. A Propose, Accept and Confirm (PAC) procedure is then carried out which involves checking with each of the components in the printing system to ensure that they will be available to perform the required

| Page | Modality | Printer Assigned By File Header | Exemplary Schedule Without Facing Page Constraint | Facing Page Constraint To Be Applied | Exemplary Schedule With Facing Page Constraint |
|---|---|---|---|---|---|
| Page 1 (S1F) | P | P1 | P1 = Printer 44 | None | P1 = Printer 44 |
| Page 2 (S1R) | K | P2 | P2 = Printer 40 | P2 = P3 | P2 = Printer 40 |
| Page 3 (S2F) | K | P3 | P3 = Printer 42 | | P3 = Printer 40 |
| Page 4 (S2R) | P | P4 | P4 = Printer 46 | None | P4 = Printer 46 |
| Page 5 (S3F) | K | P5 | P5 = Printer 40 | None | P5 = Printer 40 |
| Page 6 (S3R) | P | P6 | P6 = Printer 44 | P6 = P7 | P6 = Printer 44 |
| Page 7 (S4F) | P | P7 | P7 = Printer 46 | | P7 = Printer 44 |
| Page 8 (S4R) | P + K | P8 | P8 = Printer 44 | P8 = P9 | P8 = Printer 46 |
| Page 9 (S5F) | P | P9 | P9 = Printer 46 | | P9 = Printer 46 |
| Page 10 (S5R) | K | P10 | P10 = Printer 42 | P10 = P11 | P10 = Printer 42 |
| Page 11 (S6F) | K | P11 | P9 = Printer 40 | | P9 = Printer 42 |

Figure 6:
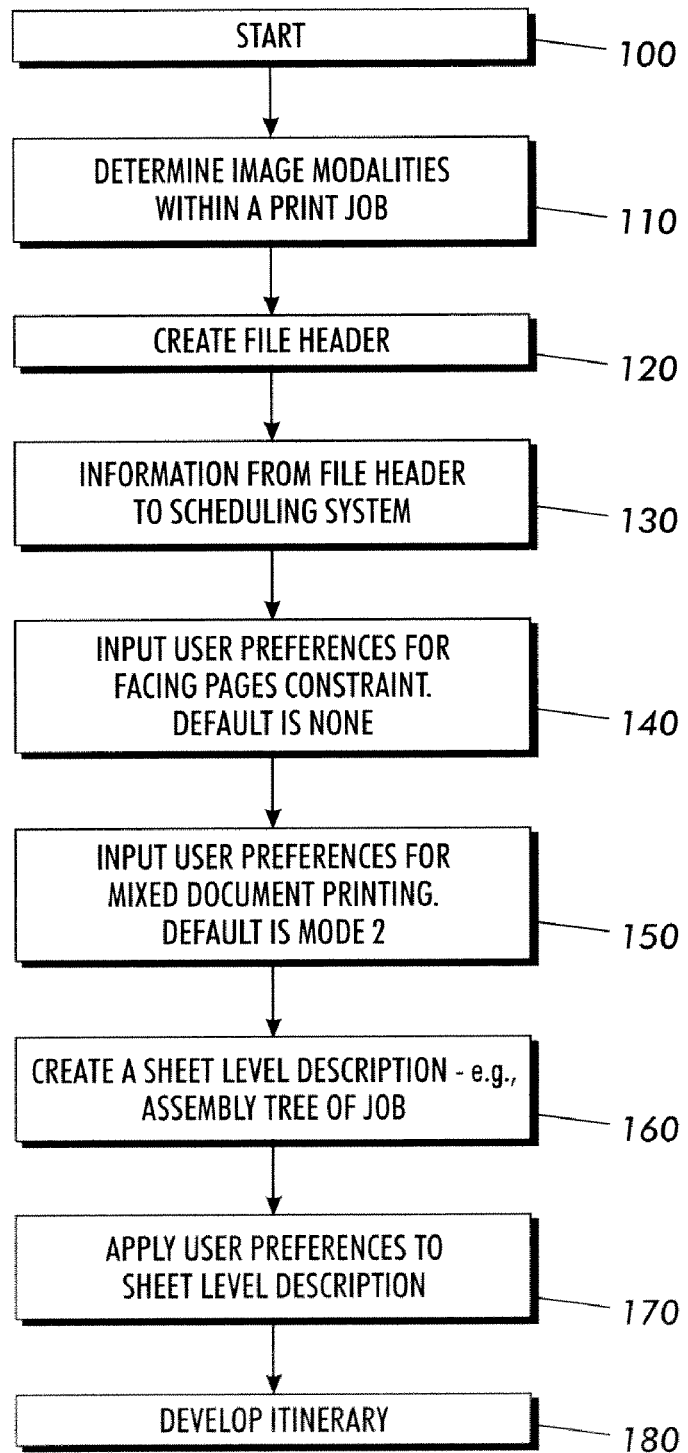
FIG. 6 shows a flowchart outlining one exemplary embodiment of a method for scheduling documents in a networked printer environment in accordance with the systems and methods described herein.

FIG. 6 shows a flowchart outlining one exemplary embodiment of the method for scheduling documents in a networked operation at the specified future time. The development of the final schedule for printing may involve several iterations in which the scheduling system assigns different printers to the pages in order to develop a schedule which the particular printing system is able to follow and which optimizes the use of printers, for example, to minimize the time taken to complete the job.

For example, for pages 2 and 3 of the eleven page document exemplified above, once the scheduling system has assigned a printer for page 2, e.g., printer 40, the facing page constraint requires page 3 to be printed on the same printer and thus will also assign that page to printer 40.

The scheduling system schedules the orientation of the sheet and its movement throughout the printing process based on the input information and built-in default criteria, as well as other information, such as the speed of each of the available printers, available pathways between the printers, and the like.

In addition to the defaults/user selectable options described above, the scheduling system may include other default and/or user selectable constraints such as whether the job should be printed in the event that the entire job cannot be printed, for example, if one or more of the printers in the printing assembly 22 are off line. The default mode in this case may be to print the document with another available printer or printers. Or the default mode may be that the job should not be printed. The operator may then be alerted that the job cannot be completed. If the default mode is to print with another printer example, one default mode may include printing with a process color printer where a custom color printer is unavailable. Another may be to print a black only page with a process color (CMYK) printer where there is no black only printing capability. Another may be to print all documents with black only printers if there is only black only printing capability.

In creating the itinerary and overall schedule for a document, the scheduling system employs the existing default constraints and the user input constraints. The itinerary may include:
1. The orientation of the sheet at time t, i.e., which side of the sheet is face up at a particular time, either the page which is a front page in the finished document or the side which is a reverse page in the finished document.
2. The printer or printers on which a page is to be printed.
3. The inverters and/or bypass routes used to determine which side is face up at any time.

When a facing pages constraint is selected by the user, the schedule includes the steps by which this is achieved. The printing system is then controlled in accordance with the schedule. For example, the network print server 12 and/or scheduling system 10 assigns the print job to the appropriate printer(s) (e.g., black only, process color, or custom color).

As shown in FIG. 1, the document scheduling system 10 can be implemented either on a single program general purpose computer or separate program general purpose computer. However, the document scheduling system can also be implemented on a special purpose computer, a programmed microprocessor or microcontroller and peripheral integrated circuit element, an ASIC, or other integrated circuit, a digital signal processor, a hardwired electronic or logic circuit such as a discrete element circuit, a programmable logic device such as a PLD, PLA, FPGA, PAL, or the like. In general, any device, capable of implementing a finite state machine that is in turn capable of implementing the flowchart in FIG. 6 can be used to implement the document scheduling system.

The disclosed method may be readily implemented in software using object or object-oriented software development environments that provide portable source code that can be used on a variety of computer or workstation hardware platforms. Alternatively, the disclosed document scheduling system may be implemented partially or fully in a hardware using standard logic circuits or VLSI design. Whether software or hardware is used to implement the systems in accordance with the exemplary embodiments is dependent on the speed and/or efficiency requirements of the system, the particular function, and the particular software or hardware systems or microprocessors or microcomputer systems being utilized. The document scheduling system and methods described above, however, can be readily implemented in hardware or software using any suitable systems or structures, devices and/or software by those skilled in the applicable art without undue experimentation from the functional description provided herein together with a general knowledge of the computer arts.

Moreover, the disclosed methods may be readily implemented as software executed on a programmed general purpose computer, a special purpose computer, a microprocessor, or the like. In this case, the methods and systems of the exemplary embodiments described herein can be implemented as a routine embedded on a personal computer such as Java® or CGI script, as a resource residing on a server or graphics work station, as a routine embedded in a dedicated print management system, web browser, web TV interface, PDA interface, or the like. The document scheduling system can also be implemented by physically incorporating the system and method into a software and/or hardware system, such as the hardware and software of a graphics workstation or dedicated print management system.

In specific embodiments, the scheduling system can be adapted to use with a variety of different printing systems. For example, the scheduling system may be programmed to receive inputs on the number, print modality, and configuration of the printers, and finishing stations in the printer assembly. The scheduling system thus can be programmed to modify the job schedules according to the number of printers of each modality, their print capabilities, in terms of ppm, the number of finishing stations, and the like.

The operation of the print driver will be described with reference to an exemplary embodiment running in Microsoft Windows. When a workstation which is running under an operating system such as Microsoft Windows invokes printing, a print driver is called to convert the contents of the document into a print data stream such as PostScript or PCL. The print driver is responsible for understanding how to translate the objects at the application level, such as character strings of a specific font, graphics, images etc. into the data stream of the printer assembly. The print driver is typically provided by the printer manufacturer. In the present case, a print driver is provided to support the functions required to separate attributes of the job that are used to enhance scheduling of pages to meet facing page constraints in the printing system.

In formatting the page into a print data stream, Windows uses a software interface called a Graphics Device Interface (GDI) between the application and the print driver. The print driver is modeled as a software object that is contained in a class known as the "CDC" class that defines a class of device context objects. The member functions of this class contain functions provided by the print driver that can translate GDI objects and control into the print data stream. One reference for GDI printing for Microsoft Windows is on the Microsoft website.

The printing protocol provided between the application and print driver is able to support the concept of a job and pages in a job. It is up to the application to define these logical breaks in the document, but the GDI printing protocol provides member functions in the CDC that communicate this logical structure to the driver.

For example, as noted in the GDI website: to print a multipage document, the framework and view interact in the following manner. First the framework displays the Print dialog box, creates a device context for the printer, and calls the StartDoc member function of the CDC object. Then, for each page of the document, the framework calls the StartPage member function of the CDC object, instructs the view object to print the page, and calls the EndPage member function. If the printer mode must be changed before starting a particular page, the view object sends the appropriate escape code by calling the Escape member function of the CDC object. When the entire document has been printed, the framework calls the EndDoc member function.

As will be appreciated from this description, the print driver has access to the logical structure of the document including individual pages. This satisfies the first requirement that a printing system has in isolating individual pages in the job at the GDI level. Each page is marked by this interface and the print driver uses this to isolate pages in the job. Between the StartPage and EndPage functions, the application uses either the OnPrint or OnDraw member functions to render elements of the page. A full description of the Microsoft documentation on the printer driver interfaces is to be found on the Microsoft website.

One skilled in the art would readily appreciate that individual instructions could be varied in form and that the sequence in which steps are performed could vary, all of which embodiments are contemplated by the disclosure and scope of the claims herein.

A band rendering loop contains code that interprets the graphics object. Without going into the details of function calls at the band rendering level, means are provided to convert the representations of graphics and image objects to a format that is understood by the printer. Part of the representation of these objects is the color of the object. In this way the printer driver can track the color of the objects on the page and tag pages for monochrome, highlight, or process color. This information can be sent as meta data with the print job to a function in the controller that separates out pages and directs them to the appropriate printer based on page attributes defined in this meta data.

While the description given here is specific to Microsoft Windows, other operating systems such as Linux and MAC OS can be configured to provide similar functions as provided by the print driver. In some cases, the print driver may be logically complied with the application as opposed to a service of the operating system. In one embodiment, the supplier of the printing system supplies a dedicated print driver which is compatible with the printing system, which can be installed in the work station.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A printing system comprising:
a plurality of printers, at least a first and a second of the plurality of printers printing in a first print modality;
a scheduling system for scheduling printing of a set of images by the plurality of printers, the set of images, when assembled, including facing pages, the scheduling system determining which of the printers to employ to complete a print job and including at least two scheduling modes:
a first mode, which is a user selected mode, in which a facing image constraint is applied by the scheduling system to the set of images, wherein the system identifies pairs of facing images in the set to be on facing pages and in which each image of a pair is associated with the same print modality, and, based on the identified pairs of images, the first mode applies the facing image constraint such that for each pair of facing images of said first print modality, both images of the pair are printed on the same printer selected from the at least first and second of the plurality of printers which print in the first print modality, such that the facing image constraint provides a level of consistency in image quality characteristics between the facing pages;
a second mode, different from said first mode, in which the facing image constraint is not applied by the scheduling system; and
wherein the printing system is configured for printing the set of images in accordance with the first mode and in accordance with the second mode.

2. The printing system of claim 1, wherein the second mode is a default mode.

3. The printing system of claim 1, wherein the printing system further comprises input means for selecting the first mode.

4. The system of claim 1, wherein the scheduling system schedules printing of the pair of facing images within a time period during which the selected printer is determined to meet preselected standards for consistency between images.

5. The system of claim 1, wherein the first modality is selected from the group consisting of black printing, process color printing, custom color printing, and magnetic ink character recognition (MICR) printing, and combinations thereof.

6. The system of claim 1, wherein the plurality of printers includes at least a third printer which prints in a second print modality, different from the first modality.

7. The system of claim 1, wherein the plurality of printers further includes at least a third and a fourth printer which print in a second print modality, different from the first print modality.

8. The system of claim 7, wherein the first mode applies a facing page constraint such that facing pages of the first print modality are both printed on the same printer or a consistent printer selected from the at least first and second of the plurality of printers which print in the first print modality and facing pages of the second print modality are both printed on the same printer or a consistent printer selected from the at least third and fourth of the plurality of printers which print in the second print modality.

9. The system of claim 1, wherein in the first mode, the scheduling system schedules printing of a first plurality of associated images on the first printer and schedules printing of a second plurality of associated images on the second printer.

10. The system of claim 1, further comprising a paper pathway network which connects the first and second printers and enables print media which has a first side printed in the first printer to have a second side printed in the second printer.

11. The system of claim 10, wherein the paper pathway network connects all of the printers in the system whereby print media travels between any printer and any other printer in the system.

12. The system of claim 1, wherein in the first mode, the scheduling system schedules printing of two facing pages of a first sheet of print media and a second sheet of print media by a printer selected from the first and second printers and schedules printing of non facing pages of the first and second sheets on at least one printer different from the printer selected for the facing pages.

13. A printing system comprising:
a plurality of printers, at least a first and a second of the plurality of printers printing in a first print modality;
a scheduling system for scheduling printing of a set of images by the plurality of printers, the set of images, when assembled, including associated images, the scheduling system including at least two user-selectable scheduling modes:
a first mode in which a consistency constraint is applied by the scheduling system to the set of images, wherein the system identifies associated images in the set to be on facing pages, in which each associated image is associated with the same print modality, and wherein in the first mode, the associated images identified by the system to be on facing pages and as being associated with the same print modality are required to be printed on the same printer selected from the at least first and second of the plurality of printers which print in the first print modality, such that the consistency constraint provides a level of consistency between the associated images;
a second mode, different from said first mode, in which the consistency constraint is not applied, wherein in the second mode, the associated images are not required to be printed on the same printer selected from the at least first and second of the plurality of printers and are printed on at least one of the first and second of the plurality of printers which print in the first print modality; and
wherein the printing system is configured for printing the set of images in accordance with the first mode and in accordance with the second mode.

14. The system of claim 13, wherein the associated images include facing images and the consistency constraint is a facing image constraint.

15. A printing system comprising:
a plurality of printers, at least a first and a second of the plurality of printers printing in a first print modality, the plurality of printers of a first modality comprises a plurality of consistent printers which have been determined to meet preselected standards for consistency;
a scheduling system for scheduling printing of a set of images by the plurality of printers, the set of images, when assembled, including facing pages, the scheduling system including at least two scheduling modes:
a first mode in which a facing image constraint is applied by the scheduling system to the set of images wherein the system identifies pairs of associated images in the set which are to form facing pages in which each associated image in a pair is associated with the same print modality, and wherein in the first mode, the scheduling system assigns at least a first of the pair of associated images identified by the system to a first of consistent printers and assigns at least a second of the pair of associated images identified by the system to at least one of the first of the consistent printers and a second of the consistent printers, such that the facing image constraint provides a level of image consistency between the facing pages;
a second mode, different from said first mode, in which the facing image constraint is not applied; and
wherein the printing system is configured for printing the set of images in accordance with the first mode and in accordance with the second mode, the scheduling system scheduling printing of the first and second of the associated images in the first mode on consistent printers only during a time period in which the consistent printers are determined to meet the preselected standards for consistency, and otherwise uses the same printer for ensuring consistency.

16. A method of printing comprising:
associating each of a set of images with at least one print modality selected from a plurality of print modalities;
providing for receiving a user's selection of one of at least two user-selectable modes;
by computer implemented means, identifying a group of images in the set of images for which a facing image constraint is to be applicable to pairs thereof, each image in the group being associated with at least a first print modality which is the same for each image;
by computer implemented means, scheduling a sequence of printing the set of images by a plurality of printers, according to a selected one of the at least two user-selectable modes including:
a first mode in which the facing image constraint is applied to the group of images, wherein in the first mode the sequence of printing at least maximizes a number of the pairs of facing images in which each image of the pair is printed with the same printer selected from a plurality of the printers which print in the first print modality; and
a second mode, different from said first mode, in which the facing image constraint is not applied; and
printing the set of images according to the selected one of the first mode and the second mode.

17. The method of claim 16, wherein the printing is performed with at least two of the printers of the same print modality.

18. The method of claim 16, wherein the associating is effected by a workstation print driver.

19. The method of claim 16, wherein the first modality comprises at least one of the group consisting of black printing, process color printing, custom color printing, and magnetic ink character recognition (MICR) printing, and combinations thereof.

20. The method of claim 16, wherein the printing includes applying the images to printed media which form pages of a document and wherein at least one of the pages includes an image of the first print modality and an image of a second print modality.

21. The method of claim 16, further comprising:
selecting one of the first mode and the second mode by user input means.

22. A storage device, capable of implementing a finite state machine, comprising information for scheduling printing of a set of pages for printing by a plurality of associated printers, comprising:
information that for the set of pages:
associates a plurality of the set of pages with a first print modality from a set of print modalities;
associates a second plurality of the pages of with a second print modality different from the first print modality;
identifies pairs of facing pages in which each page is of a pair associated with the same print modality;

in a first mode, based on the identified pairs of facing pages, schedules printing of the set of pages such that for each pair of facing pages in which each page is associated with the first print modality, each page of the pair is required to be printed with the same printer;

in a second mode schedules printing of the set of pages differently from the first mode, whereby facing pages are printed on different printers of the same print modality; and applies one of the first and second modes as a default mode and the other of the first and second modes as a user selected mode.

23. The storage medium of claim 22, wherein the information that associates a plurality of the set of pages with a first print modality and associates a second plurality of the pages with a second print modality different from the first print modality is effected by a workstation print driver.

24. A printing system comprising the storage device of claim 22, further comprising:

a plurality of printers, a first plurality of the printers being configured for printing in the first print modality and a second plurality of the printers being configured for printing in the second print modality.

25. A xerographic printing system comprising:

at least one source of print media;

a plurality of printers which apply images to the print media, at least a first and a second of the plurality of printers printing images in a first print modality selected from black printing and process color printing;

a network of paper pathways which links the plurality of printers and the at least one source of print media with at least one print media output destination;

a scheduling system for scheduling printing of a set of images by the plurality of printers, the set of images, when assembled, including associated images, the scheduling system including at least two scheduling modes:

a first selectable mode in which a facing image constraint is applied to the set of images, the system identifying pairs of facing pages in which each page is of a pair associated with the same print modality to be printed on the same printer or a consistent printer which prints in that print modality, such that the facing image constraint provides a level of image consistency between facing images of the associated images;

a second selectable mode, different from said first mode, in which the facing image constraint is not applied, wherein when the first print modality is process color printing, facing color images are scheduled to be printed on different ones of the plurality of process color printers and when the first print modality is black printing, facing black and white images are scheduled to be printed on different ones of the plurality of black printers; and wherein the printing system is configured for printing the set of images in accordance with the first mode and in accordance with the second mode.

* * * * *